(12) United States Patent
Kataria et al.

(10) Patent No.: US 8,032,431 B2
(45) Date of Patent: *Oct. 4, 2011

(54) SYSTEM AND METHOD FOR MANAGING THE DEVELOPMENT AND MANUFACTURING OF A PHARMACEUTICAL

(75) Inventors: Anjali R. Kataria, San Carlos, CA (US); Kamlesh Rashmi Desai, Menlo Park, CA (US); Vinay R. Ambekar, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/857,787

(22) Filed: Aug. 17, 2010

(65) Prior Publication Data

US 2010/0312674 A1    Dec. 9, 2010

Related U.S. Application Data

(63) Continuation of application No. 11/633,048, filed on Nov. 30, 2006, now Pat. No. 7,801,777, which is a continuation-in-part of application No. 10/914,538, filed on Aug. 9, 2004, which is a continuation of application No. 10/052,412, filed on Jan. 23, 2002, now abandoned.

(60) Provisional application No. 60/263,177, filed on Jan. 23, 2001.

(51) Int. Cl.
*G06Q 10/00* (2006.01)
*G06F 19/00* (2006.01)

(52) U.S. Cl. .............................. 705/28; 700/97; 700/108

(58) Field of Classification Search .................. None
See application file for complete search history.

(56) References Cited

U.S. PATENT DOCUMENTS

| | | | |
|---|---|---|---|
| 3,896,659 | A | 7/1975 | Goodman |
| 5,664,112 | A | 9/1997 | Sturgeon et al. |
| 5,712,990 | A | 1/1998 | Henderson |
| 5,831,859 | A | 11/1998 | Medeiros et al. |
| 5,847,957 | A | 12/1998 | Cohen et al. |
| 6,014,729 | A | 1/2000 | Lannan et al. |
| 6,067,549 | A | 5/2000 | Smalley et al. |
| 6,243,615 | B1 | 6/2001 | Neway et al. |
| 6,256,640 | B1 | 7/2001 | Smalley et al. |
| 6,324,522 | B2 | 11/2001 | Peterson et al. |

(Continued)

FOREIGN PATENT DOCUMENTS

EP          0612039 A3    2/1994

(Continued)

OTHER PUBLICATIONS

U.S. Appl. No. 10/914,538 filed Aug. 9, 2004, Notice of Allowance dated Dec. 9, 2010, 12 pages.

(Continued)

*Primary Examiner* — Faris Almatrahi
(74) *Attorney, Agent, or Firm* — Kilpatrick Townsend & Stockton LLP

(57) ABSTRACT

A system and method for managing the development and manufacturing process of a pharmaceutical is disclosed. The method comprises capturing and recording the development and manufacturing history of the pharmaceutical in order to generate a product history. The product history is stored on a computer and is searchable in multiple data dimensions in order to easily retrieve information. The system automatically provides compliance management procedures in order to comply with regulatory standards for the pharmaceutical industry.

20 Claims, 4 Drawing Sheets

U.S. PATENT DOCUMENTS

| | | |
|---|---|---|
| 6,345,259 B1 | 2/2002 | Sandoval |
| 6,397,115 B1 | 5/2002 | Basden |
| 6,401,085 B1 | 6/2002 | Gershman et al. |
| 6,458,595 B1 | 10/2002 | Selinfreund |
| 6,567,788 B1 | 5/2003 | Johnson |
| 6,741,998 B2 | 5/2004 | Ruth et al. |
| 6,853,920 B2 | 2/2005 | Hsiung et al. |
| 6,865,509 B1 | 3/2005 | Hsiung et al. |
| 6,873,914 B2 | 3/2005 | Winfield et al. |
| 6,904,370 B1 | 6/2005 | Levinson et al. |
| 6,917,845 B2 | 7/2005 | Hsiung et al. |
| 6,947,866 B2 | 9/2005 | Staab |
| 6,985,779 B2 | 1/2006 | Hsiung et al. |
| 6,988,109 B2 | 1/2006 | Stanley et al. |
| 7,031,778 B2 | 4/2006 | Hsiung et al. |
| 7,123,978 B2 | 10/2006 | Hartman et al. |
| 7,131,069 B1 | 10/2006 | Rush et al. |
| 7,146,231 B2 | 12/2006 | Schleiss et al. |
| 7,174,230 B2 | 2/2007 | Arackaparambil et al. |
| 7,206,646 B2 | 4/2007 | Nixon et al. |
| 7,233,834 B2 | 6/2007 | McDonald et al. |
| 7,275,070 B2 | 9/2007 | Kataria et al. |
| 7,487,182 B2 | 2/2009 | Kataria et al. |
| 7,797,327 B2 | 9/2010 | Kataria et al. |
| 7,801,689 B2 | 9/2010 | Kataria et al. |
| 7,801,777 B2 | 9/2010 | Kataria et al. |
| 7,925,550 B2 | 4/2011 | Kataria et al. |
| 2001/0049595 A1 | 12/2001 | Plumber et al. |
| 2001/0049615 A1 | 12/2001 | Wong et al. |
| 2001/0049673 A1 | 12/2001 | Dulong et al. |
| 2002/0078217 A1 | 6/2002 | Thomas et al. |
| 2002/0083364 A1 | 6/2002 | Christensen et al. |
| 2002/0111888 A1 | 8/2002 | Stanley et al. |
| 2002/0123957 A1 | 9/2002 | Notarius et al. |
| 2002/0134456 A1 | 9/2002 | Soehnien et al. |
| 2002/0143673 A1 | 10/2002 | Hitchings et al. |
| 2002/0165806 A1 | 11/2002 | Kataria et al. |
| 2002/0188465 A1 | 12/2002 | Gogolak et al. |
| 2003/0004608 A1 | 1/2003 | O'Dougherty et al. |
| 2003/0028420 A1 | 2/2003 | DeBlasse |
| 2003/0050868 A1 | 3/2003 | Hoffman et al. |
| 2003/0093295 A1 | 5/2003 | Lilly et al. |
| 2003/0141358 A1 | 7/2003 | Hudson et al. |
| 2004/0186795 A1 | 9/2004 | Taylor et al. |
| 2004/0190369 A1 | 9/2004 | Cosman et al. |
| 2004/0210473 A1 | 10/2004 | Goddard |
| 2004/0236463 A1 | 11/2004 | Weselak et al. |
| 2005/0015166 A1 | 1/2005 | Kataria et al. |
| 2005/0038565 A1 | 2/2005 | Power et al. |
| 2005/0067425 A1 | 3/2005 | Bartholomew et al. |
| 2005/0158798 A1 | 7/2005 | Sher |
| 2005/0160077 A1 | 7/2005 | Howes |
| 2005/0197786 A1 | 9/2005 | Kataria et al. |
| 2005/0216383 A1 | 9/2005 | Kuhn et al. |
| 2005/0237213 A1 | 10/2005 | Teller |
| 2005/0246223 A1 | 11/2005 | Roth et al. |
| 2005/0251278 A1 | 11/2005 | Popp |
| 2007/0185759 A1 | 8/2007 | Kataria et al. |
| 2007/0192715 A1 | 8/2007 | Kataria et al. |
| 2008/0091291 A1 | 4/2008 | Charu |
| 2008/0133294 A1 | 6/2008 | Kataria et al. |

FOREIGN PATENT DOCUMENTS

| | | |
|---|---|---|
| EP | 0965897 A1 | 12/1999 |
| GB | 2347234 A | 2/2000 |
| WO | WO 03-075206 A2 | 9/2003 |
| WO | WO 2004-072868 A1 | 8/2004 |

OTHER PUBLICATIONS

PCT International Search Report and Written Opinion for corresponding PCT application PCT/US07/24020, Aug. 16, 2008.

PJB Publications Ltd. "A Tour of Pharmaprojects", Pharmaprojects Web/CD-Rom Version 5, 2003, pp. 1-40.

U.S. Appl. No. 10/914,538, filed Aug. 9, 2004, Office Action dated Jan. 5, 2010, 9 pages.

U.S. Appl. No. 10/914,538, filed Aug. 9, 2004, Final Office Action dated Aug. 16, 2010, 10 pages.

U.S. Appl. No. 11/022,316, filed Dec. 23, 2004, Office Action dated Aug. 4, 2006, 12 pages.

U.S. Appl. No. 11/022,316, filed Dec. 23, 2004, Final Office Action dated Apr. 6, 2007, 15 pages.

U.S. Appl. No. 11/022,316, filed Dec. 23, 2004, Notice of Allowance dated Jul. 25, 2007, 7 pages.

U.S. Appl. No. 11/430,680, filed on May 8, 2006, Office Action dated Jun. 26, 2008, 16 pages.

U.S. Appl. No. 11/430,680, filed on May 8, 2006, Notice of Allowance dated Dec. 15, 2008, 7 pages.

U.S. Appl. No. 11/633,048, filed on Nov. 30, 2006, Office Action dated 10/30/09, 8 pages.

U.S. Appl. No. 11/633,048, filed on Nov. 30, 2006, Notice of Allowance dated May 17, 2010, 7 pages.

U.S. Appl. No. 11/824,812, filed on Jul. 3, 2007, Office Action dated Jul. 10, 2008, 23 pages.

U.S. Appl. No. 11/824,812, filed on Jul. 3, 2007, Final Office Action dated Mar. 27, 2009, 24 pages.

U.S. Appl. No. 11/824,812, filed on Jul. 3, 2007, Office Action dated Aug. 19, 2009, 6 pages.

U.S. Appl. No. 11/824,812, filed on Jul. 3, 2007, Notice of Allowance dated May 18, 2010, 5 pages.

U.S. Appl. No. 11/859,725, filed on Sep. 21, 2007, Notice of Allowance dated May 5, 2010, 7 pages.

U.S. Appl. No. 11/859,725, filed on Sep. 21, 2007, Office Action dated Nov. 30, 2009, 5 pages.

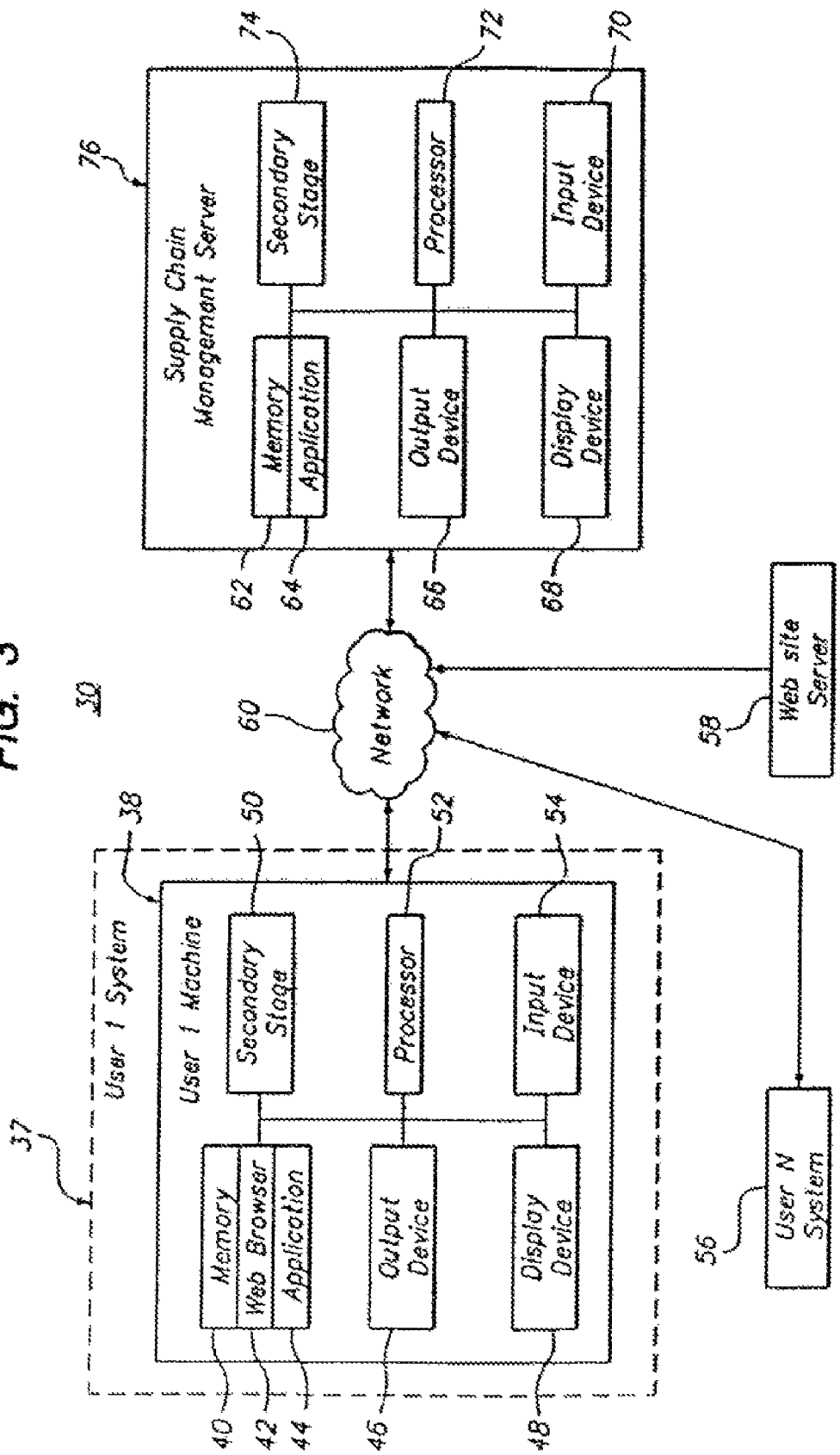

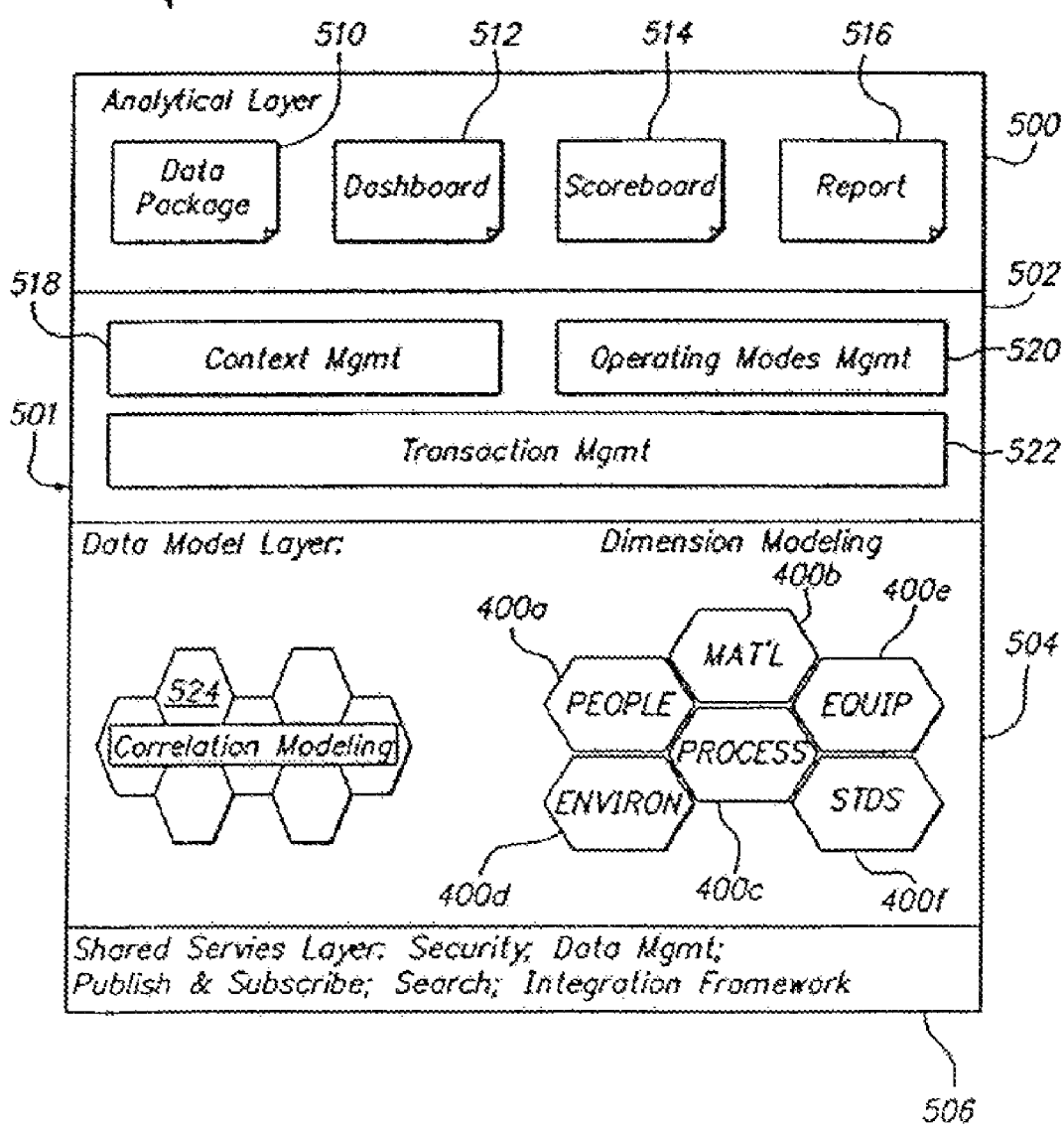

SYSTEM AND METHOD FOR MANAGING THE DEVELOPMENT AND MANUFACTURING OF A PHARMACEUTICAL

CROSS-REFERENCES TO RELATED APPLICATIONS

This Application is a continuation application of U.S. patent application Ser. No. 11/633,048 by Anjali R. Kataria et al., filed Nov. 30, 2006, which is a continuation-in-part of U.S. patent application Ser. No. 10/914,538, filed Aug. 9, 2004, which is a continuation of U.S. Pat. No. 10/052,412, filed Jan. 23, 2002, which claims the benefit of U.S. Provisional Application No. 60/263,177, filed Jan. 23, 2001," each of which is hereby incorporated herein by reference.

BACKGROUND OF THE INVENTION

1. Field of the Invention

This invention relates to management of regulated industries. In particular, the present invention facilitates regulatory, tax compliance, inventory and e-warehouse management of regulated industries.

2. Description of the Related Art

Heavy regulated and process oriented industries such as Oil & Gas, Food (e.g., agriculture products, processed food, meat/poultry, etc.), Beverages (e.g., consumable liquids such as spirits, beer, juice, etc . . . ), Chemicals, Consumer products (e.g., cosmetics and skin care),and Pharmaceutical Drugs (e.g., Chemical Development (also known as Drug Substance), Pharmaceutical Development (also known as Drug Product), Biopharmaceuticals (Drug Substance and Drug Product) as well as Generics) share a number of common characteristics. These kind of process industries are highly regulated by local, state, federal and international agencies such as, for example, the Food and Drug Administration (FDA), the Trade and Tax Bureau (TTB part of the Treasury), to ensure that safe and efficacious products are consumed by the public and that each of the products presented by companies in these aforementioned industries are not fraudulent or harmful (e.g., that the product integrity is maintained for the life of the product). The product integrity is proven, in part, by comparing product records at one point in time against product history records of another point in time during the development, manufacturing and commercial sale of these products. This is challenging for these kinds of heavily regulated process industries because, by nature, they tend to produce products that are dynamically changing or very complex. Thus, the information associated with these product history records becomes more difficult to manage. For example, these industries may require highly variable raw materials such as proteins secreted from mammalian cells or grape juice secreted from agriculture vine-grapes.

Another major requirement for "heavily regulated industries" is the ability of a company to demonstrate that it's production processes from development through commercial manufacturing are fully traceable, meaning that a third party (such as an Agency e.g., FDA) could come in and demand to see product history form one point in time to another. For instance, a company must be able to prove that "what it is producing is indeed being produced, in the manner it claims to be being produced in." These onsite inspections, audits, and information requests often focus on a particular process for a particular set of materials from one point in time to another. Failure to provide immutable proof of product history traceability has subjected companies to large fines, as well as shutdowns.

In addition for failure to provide proof of the process over time, these industries are usually subject to large fines or delays in production/shutdowns for non-compliance of any part of the submission application, audits, labels, waste, emissions, safety, etc. Payment of the appropriate taxes is an ongoing challenge as the payments are determined by the "amount produced" and "type" of product produced, all of which require extensive record keeping along many dimensions over time.

These industries are also "heavily process oriented" meaning that products are produced in a manner that consists of extensive combinations of steps such as complex blends, formulations and recipes. Another drawback is that, in some of these industries (e.g., the pharmaceutical and beverage industries), extensive record keeping is required to create the product history "paper trail."Typically, the kind of record keeping required by these industries is a complete history of the product's lifecycle, often spanning from the raw materials to the final product and inclusive of all intermediate products across the supply chain. The type of information required in the record keeping of product history typically spans the following dimensions: personnel and their training requirements, process, materials, equipment, standards, and facility/environment, information that collectively form the comprehensive information for the specified record.

These industries may also have complex order tracking for work personnel, equipment materials, processes (e.g., campaign planning and execution, work order generation, etc.). For instance, tracking the state of materials from raw material to intermediates, to final products etcetera or tracking the equipment history (calibration, cleaning, usage, etc.) requires a number of different kinds/pieces of information making it a complex process. Not only does the information in these areas have to be recorded and tracked, but it must be compared to standards set both internally within the company and externally by regulating authorities. Furthermore, it must be compared to itself at differing points in time (e.g., Commercial Manufacturing takes place in Year 9 and the equipment set up, calibration, cleaning and usage is recorded, tracked and compared against the equipment history in Year 8, which was submitted to regulating authorities and is what the company's license to commercially manufacture is based upon).

These types of regulated process industries are further challenged in that a number of different indirect/input goods are produced along the path of creating the final product and all of these indirect/input/intermediate goods have to be managed in a similar manner of recording information/tracking/comparing to different points in time as described above. Visibility is essential to achieving this comprehensive record keeping and management of information in these regulated process industries, yet at present these industries have low visibility at all levels of process input and product history across the supply chain.

As an example, compliance in the wine industry begins as soon as the grapes reach the winery. This means that wineries must track where the grapes were grown, how they were shipped to the winery and the tonnage used throughout production, bottling and aging. The manufacturing process can go on for many years. In addition, alcohol content during fermentation and the bottling/aging process must be tracked. Because a winery's ability to comply with the multitude of regulations hinges on capturing specific information throughout the continuous production process which is also tied to inventory, it is important that compliance be tied into the winery's supply chain management.

Wineries today also have limited visibility into their internal operations, with little real-time information of their wine in-process inventory levels. The wine making side of the industry often lacks the ability to report how many bottles of a certain type of wine are present in their cellar. They also find it difficult to match production levels with inventory needs, resulting in inefficient buying.

Wineries often enjoy preferred supplier relationships formed by verbal or consolidated purchasing among their subsidiaries resulting in varying pricing agreements. Therefore, wineries regard their ingredients, supplier lists, and their recipes as proprietary information requiring high levels of security. Also, wineries have limited technology staff, thus requiring greater external hands-on support.

Known computer-based products that focus on one particular need of the wine industry do not address the problems described above. Known systems lack total supply chain management solutions and do not provide complete regulation and tax compliance management. Furthermore, the current systems provide licensing on a per seat basis; and have limited ability to provide visibility into internal operations and in particular lack real time accessibility to all employees of the company.

As a result of the above problems in the wine industry, everything from inventory management, regulatory and tax compliance, and order fulfillment on the supply side is fragmented both inside and outside the enterprise and is labor intensive, inefficient, and expensive. Regulatory and tax compliance is manual, complex and time consuming. Suppliers and buyers lack visibility and parent companies have little real time information on the buying and spending categories of their subsidiaries. Also there is little coordination between supplier production and buyer demand. As a result of such problems, the cost of goods sold in the wine industry averages 50-80% of net revenues, and general and administrative costs are often as high as 10-35% of net revenues.

Currently, there are no broad web-based solutions that fully meet these kinds of complex needs such as comprehensive product history record keeping in process management of heavily regulated industries. In fact, many of the record keeping functions and filing processes for federal and state regulations still occur through outdated manual time-consuming means.

SUMMARY OF THE INVENTION

This application generally relates to applicant's co-pending U.S. Patent Application entitled "System And Method For Managing The Development And Manufacturing of A Pharmaceutical Drug," filed Dec. 23, 2004, the contents of which are incorporated by reference herein.

The present invention describes systems and methods for enabling information management across the supply chain from raw material to final product for regulated process industries. The systems and methods enable a company to manage extensive record keeping for heavily regulated products where the key components are often dynamically changing and are very complex to manage. The embodiments facilitate a regulatory and tax database with automated compliance and tax reporting. For example, regulatory management and automated compliance are achieved by the system enabling a company to automatically demonstrate compliance with federal regulatory agency submission requirements, traceability of any dimension of beverage development, and retrieval of key information necessary to meet audits, inspections and product integrity inquisitions. Because the systems and methods are integrated with smart inventory and e-warehouse management solutions, the essential product history information from "candidate selection to commercial manufacturing" is automatically captured for comparisons, correlations, and verifications enabling the company to demonstrate compliance to the federal agency. For example, the full lifecycle management of raw materials, expendables and intermediates can be demonstrated. This information associated with raw materials and intermediates at each stage is leveraged into the record keeping needs of the company to demonstrate full product history of the lifecycle. The embodiments are applicable to regulated industries such as, for example, beverages.

The present invention allows regulatory compliance integration with complete, real time web-based supply chain infrastructure to manage all essential product history from raw material stage to final product. The system has enough customization for each industry allowing the domain, regulatory and tax specificities to be addressed. Complete product history includes key information along the essential dimensions of product development and manufacturing: People, Process, Materials, Equipment, Environment/Facility and Standards (regulatory and internal). The present invention allows for management of regulatory (standards) with automated compliance, tax reporting and in-process inventory management of development and production of pharmaceuticals.

The present invention provides industry-specific solutions to regulatory and tax compliance issues, including integrated industry-specific supply chain applications to assist in compliance. The present invention is designed to operate alongside existing information systems such as enterprise resource planning (ERP), manufacturing execution system (MES), laboratory information management systems (LIMS), emissions and dispersion modeling system (EDMS), as well as others, to provide complimentary applications.

The system enables users to manage regulatory filings, tax compliance, and inventory (e.g., raw materials, intermediates, final products). This aspect reduces supply chain inefficiencies with a real-time, web-based, enterprise-wide supply chain infrastructure. A substantial reduction of the current cumbersome paper trail is achieved by the system and affords users a more accurate and timely compliance, thus avoiding violations and substantial fines/penalties.

The system may provide supply chain solutions to increase visibility throughout a regulated industry's operations. This aspect enables greater information management through secure access to real time information and advanced planning. This aspect provides users worry-free management while reducing costs, inventory levels, and decreasing working capital needs. The system can be wireless ready, enabling the user to more efficiently and effectively manage critical data.

The system may provide clear comprehensive product history information, enabling the company to demonstrate integrity and to show product traceability from one point in time to another along multiple dimensions of: people, process, materials, equipment, standards and environment/facility.

Through an extremely scalable platform, the system can enable real time web-based regulatory and tax compliance based supply chain infrastructure while also providing regulatory and tax compliance, inventory management, content management and supplier catalog management modules. Procurement, shipping management, demand and forecasting tools and regulatory e-filings complement the supply chain solutions.

The system can interface with many third party enterprise resources; planning applications and existing legacy systems. In some embodiments, the system is java-based, using open applications programming interface (API) systems. The system can be highly scalable, flexible, robust, modular and portable (e.g. personal digital assistant and wireless capable). The system can use thin client architecture requiring only a web browser and implemented without requiring desktop installation. The system can support the Secure Sockets Layer (SSL) to protect the transmission of content between the browser and the server. In addition, user identification and password protections may be embedded, as well as controls based upon user roles.

The systems of the present invention, through the use of a core platform and modules, can provide extensive management of record keeping across multiple dimensions over time. For instance, material management functionality for beverage processing is provided by the systems and methods of the present invention. Specifically, the chain of custody for beverage processes can be recorded. In some embodiments, the system manages all related information for each type of material (e.g., Specifications, etc . . . ). Material traceability from loading dock to final product is provided by knowing with certainty the who, what, where, when and how of all materials. Furthermore, it is possible to locate and create materials with the system. Requests, orders, inventory, dispense, dispose and transfer of all materials is known. The chain of documentation is also recorded through the use of status, signoff, alerts, authentication, e-signatures, and hazard profiles. Similar functionality exists for all dimensions of beverage processing over time.

The quality of the product can be managed by the system. The material qualification IDs are recorded, as well as raw material specifications. Materials can be sorted and tracked on any characteristic of the material by the system.

The system can also manage the equipment used in the manufacturing process. Reservation for equipment use, as well as equipment characteristics, usage and availability can be viewed with the system. Furthermore, equipment usage, loaning, borrowing, and decommission can be tracked. The maintenance and cleaning of equipment can also be tracked with the system.

Those skilled in the art will appreciate these and other advantages and benefits of various embodiments of the invention upon reading the following detailed description of a preferred embodiment with reference to the below-listed drawings.

BRIEF DESCRIPTION OF DRAWINGS

FIG. 3 is a block diagram illustrating hardware components for implementing a web based supply-side chain management application;

FIG. 5 illustrates a platform overview for the core module of the system.

DETAILED DESCRIPTION OF A PREFERRED EMBODIMENT

Figure 1:
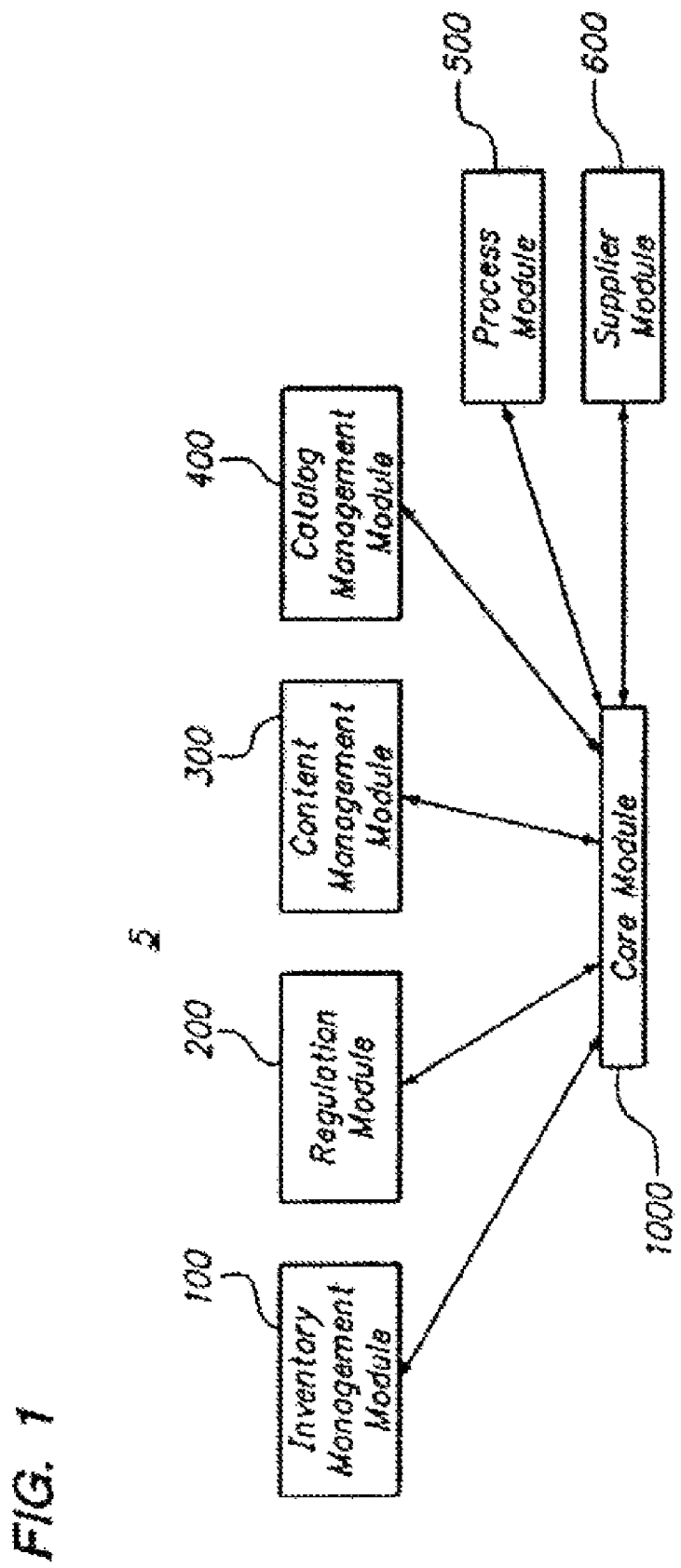
FIG. 1 is a block diagram of a system according to a first embodiment.

FIG. 1 is a block diagram of a product conformance management system 5 having an inventory management module 100, a regulation module 200, a content management module 300, a catalog management module 400, a process module 500, a supplier module 600, and a core module 1000. It will be recognized by those of ordinary skill in the art that the number and types of modules available may change based on industry type. For example, for the wine making industry, there may also be a blend management module a barrel management module, a tank management module, a cellar management module, a trial blending module and a formula wines module. In this regard, a solution for a specific industry may contain many suites which are a collection of modules. Each of the modules is independently deployable on the platform. By having the multiple modules, the solution can be easily deployed and expanded at customer sites in a phased manner. The description below is tailored for the wine industry, but it will be recognized that the system of the present invention can be used with any heavily regulated beverage process (e.g. production of spirits, beer, etc . . . ).

The inventory management module 100 includes domain knowledge of the wine industry to specifically address the needs of the wine industry. Specifically, the inventory management module 100 records the movement of unlabeled grapes and juice and their differing values as they move through the production process, as well as tracking harvests, and spoilage factors. In addition, the inventory management module 100 provides visibility info a company's inventory at the subsidiary or corporate level, as well as tracking the inventory through the winemaking process. The inventory management module 100 implements inventory threshold levels and reorder points, and triggers a notification via email, pager or WAP. The. inventory management module 100 also provides the ability for both the winery and their supplier to view internal inventory levels. The inventory management module 100 provides for receipt and issue of goods, movement of goods, and verification of goods locations. Accordingly, the inventory management module 100 can track goods from the development process and into and through the production cycle.

The regulation module 200 addresses the need for compliance with complex and varied federal and state regulations for alcohol production. The regulation module 200 provides current regulatory and tax compliance information affecting the wine industry. This regulatory and tax database also includes automated compliance and tax reporting. The regulation module 200 can be linked with the Federal Drug Administration (FDA), Bureau of Alcohol Firearms and Tobacco (BATF), state agencies, and other on-line sources of legal information to create this database. The regulation module 200 combined with the platform (core module 1000) enables an electronic product history record (ePHR) to be created for both development and manufacturing.

The content management module 300 is a relational database of industry-specific, company-specific, activity specific or supplier-specific information such as industry news, documents, inventory alerts, weather patterns, farming data, inventory alerts, specification sheets, certificates of analysis, methods, and standards.

Suppliers that sell products typically have some sort of catalog, whether it be online or in hardcopy. The catalog management module 400 provides the manufacturer (e.g., winery) with a consolidated view of similar products across a number of suppliers and provides the company with a list of ingredients, costs associated with each product, procurement related information for each product and release information.

The process module 500 captures data from various stages of the beverage production process. The captured data can include activity records or lab analyses records. The records allow traceability for audit and regulatory compliance of all stages of the material (from raw material to intermediates to bulk product to final product). Process module 500 also enables extensive record keeping/through campaign planning and execution, tying all process steps, people involved, equipment used, materials used, standards followed, and facility location information.

The supplier module 600 provides the company/user the ability to manage suppliers and the associated catalog of products purchased by the company, as well as the costs associated with the transaction. The supplier module 600 along with the core module 1000 enables the company to have an automated system for tracking and recording information regarding the products purchased by the company.

The core module 1000, also referred to as the "Product Conformance Management (PCM) Platform, is the base module for the system 5. The core module 1000 implements the functionalities of the system 5 and is a common platform that can be configured by the customer for various business and regulatory processes in the company. The core module 1000 manages the library of all information regarding material, equipment, process, people, standards and environment related to a customer's regulated process. The core module 1000 dynamically defines all attributes according to the customer's requirements. The core module 1000 provides valid values, either ranges or enumerations, and defines data types and value generation algorithms (if any). The core module 1000 can also define units of measure and support conversion between different units.

Furthermore, the tore module 1000 manages the states of all information objects, workflow for approval and "state" changes (e.g., management of the dynamic and highly variable changes). Sites and locations, as well as organizational hierarchy, is managed by the core module 1000. The core module 1000 manages users, user groups and user functions and provides the infrastructure for setting up alerts and delivering notifications to the users subscribed to the alerts. The core module 1000 moves data between software systems in a validated mode and ensures compliance with government regulations (e.g., 21 C.F.R. Part 11). Furthermore, versioning support is provided in the core module 1000. The core module 1000 also creates an audit trail of changes to the data captured in the system, attachments to any information object in the system and any number of notes attached to any information object in the system.

In order to maintain the security of system 5, core module 1000 provides access through a login which is a combination of user identification and a password. In some embodiments, after three unsuccessful attempts, the user account is disabled and an administrator notified. In some embodiments, only an administrator has the ability to unlock the account. Additionally, details about the user name, title, email address, telephone number, effective dates of usage of the system and the physical location of the user are maintained by core module 1000. The login service also identifies any of the applications of system 5 that are authorized for the user to access and the role in which the access is permitted.

In some embodiments, core module 1000 provides external authentication support by which users can be authenticated by an external system. The externals service is called with the user's identification and password. Core module 1000 can handle successful and unsuccessful attempts similar to the authentication process within system 5. When external authentication, is used, all account and password management should be handled by the external service.

System 5 can model various roles for access. These roles would not have to map to functional roles of the individual within the enterprise. The roles defined in the system are primarily used to control the access to various features of the system. Roles can be associated with an application or made available to all or a combination of applications. Roles may be location specific or enterprise wide. A user has the ability to have more than one role in the system. The role identifies the functionality of the system the role can access (e.g., menu items, screens, etc . . . ). Furthermore, the role identifies actions the role can execute on the functionality it can access (e.g., read, write, update, delete, list, etc . . . ). The role identifies the specific fields/attributes that are accessible.

In order to authenticate the input of records into the system 5, the core module 1000 supports the use of a generic method of collecting user signatures electronically. This service can be invoked by the applications whenever the requirement for an electronic signature arises. The user is prompted for the user's ED and password which is verified for accuracy. A reusable user interface component is available for all applications to ensure easy and consistent implementation of electronic signatures. This reusable component accepts the user's ID as a parameter and pre-fills that information when the user interface is presented to the user. This is an aid when a continuous set of signatures is needed to be accepted. Each signature is stored against the activity being certified/signed off by the user.

Alerts are very important to system 5. Alerts are used for a large number of activities and pro-active notifications. Therefore alerts are highly scalable and generic. Customers can associate alerts to objects identified by an application at any time without having to shutdown the system.

Each application identifies objects that are expected to have alerts associated with them (e.g., work orders, material receipt, equipment schedule, etc.) and the various attributes of the object whose change of value would result in an alert. It is possible to define the type of comparison that is performed against the attribute to generate the alert. All common types of comparisons—equality, inequality, greater than, lesser than range or list, can be supported.

Types of actions which trigger alerts are user actions that change an object (create, modify, delete) and time based triggers (cheek overdue activities). Optionally, it is possible to attach a custom code to be executed when the alert condition is reached. This helps embed computational logic, if required for generating notifications.

In a deployed system, an administrator is able to publish the alerts that are available to the users of system 5. This is done by identifying the roles and/or users who are allowed to subscribe to a given alert. Publication is achieved through the generic system wide publish/subscribe mechanism.

When a user attempts to subscribe to alerts, only those published to the user and the user's role should be listed. Users can then choose the actual alert that they want to subscribe to and provide the information required to complete the subscription. Through a user interface, the end user is able to define the exact conditions when they want to be notified. The end user has the ability to select the object and its attributes and assign the values which would trigger the notification. Depending on the user's object level permissions, the user can specify notification criteria only for attributes the user has read access.

The user has the ability to select the method of delivery of the notification. Notifications are delivered to the user's personal alert list in system 5. Additionally, the user can choose to have the alert delivered by email. It will also be recognized that alert notifications can be delivered to pagers and cell phones.

Ensuring that, the user is properly alerted is a key responsibility of system 5 and hence core module 1000. An alerts pane on each of the pages of system 5 is generated by core module 1000. The pane identifies the alert and some key attributes of the notification. When the user is active in any application of system 5, the alerts pane is constantly updated with the latest notifications that have not been acknowledged by the user.

All notifications to the user are viewable through an interface dedicated to alert notifications. The user is able to view all of the relevant details of the notification through this interface and also manage the notifications. The user is able to acknowledge having seen the notification so that it is no longer shown in the alerts pane and/or delete the notification.

Applications of system 5 need to co-exist with multiple commercial enterprise applications and niche products, as well as with many custom in-house solutions. For successful deployment of the applications and to provide a repository of electronic product development; the core module 1000 should be capable of easily exchanging data with other systems. To achieve this, core module 1000 provides an integration framework that is used to configure or build the integrations. The framework complies with the following requirements:

Middleware Independence. No assumptions are made based on vendor specific middleware products. Deployment engineers are able to configure the framework to communicate with any external system or middleware (e.g., TIBCO, WebMethods, SeeBeyond, Yitria, etc.) which may be specified by the customer. Industry standards like web services and JMS are supported in preferred embodiments.

XML Data Format. Data moving between the systems should be encoded in XML to conform to industry trends. Existing industry standard specifications like BatchML from World Batch Forum are supported.

Integration Event Based Triggers. The framework can move data in real time based on data modification triggers as well as through periodic batch mode updates. The integration framework can hook into the generic system wide alert notification framework to achieve this.

Back-end (application level) Integration Support. Based on event triggers, the framework is able to post the data to a web service, URL (http port), JMS server, or through simple export to sequentially labeled files. The integration framework is able to accept incoming data through, a web service or a JMS server.

Bi-directional Data Exchange. The system 5 can publish data out from the system as well as provide an ability to insert and modify data within the system.

Identification of system of record. The system 5 has the ability to define a list of applications and identify one of the systems as the owner of record (master) for each data item.

Organizational Mapping. Generally the name of the organizational unit is required to provide the context of the data being exchanged. The name given to a particular organization unit may differ between different external systems and between those of the system 5. The core module 1000 provides a means of mapping these names. This mapping should not be assumed to be a simple 1<->1 mapping.

Attribute Mapping. One data item may be identified by two different names in two different systems. The framework should provide a generic name mapping functionality (for example where integrations are deployed without middleware). Mappings should be configurable on-site both during and after deployment. It should be possible to associate multiple groups of mappings with a particular external system, using mapping set identifiers.

UOM Mapping. For parametric data it is common that the unit of measure used in the source system for a particular data item is different than the unit of measure that the target system is expecting. The integration framework should include a mechanism to handle this. The mapping should be configurable on-site both during and after deployment. It should be possible to associate multiple groups of mappings with a particular external system using mapping set identifiers.

Backward Compatibility. In preferred embodiments, the framework defines a published open applications programming interface (API). Minor revision version changes to the API should not require changes to integrations built using the API. Where there is a version incompatibility, the version mismatch should be detected and reported.

Performance and Scalability. Transactions are processed in direct proportion to the number of transactions processed by the system 5. Theoretically, an edit of any object in the system could trigger a data movement through the integration framework. The end-to-end delay and throughput overhead imposed on transactions by the integration framework is not a major factor in the overall end-to-end delay or throughput experienced by the actual user.

Logging. Data exchange events are logged with errors for debug by the framework. Optionally, debug logs are available to help track data movement. All logs are at user specified locations and should be self-maintaining. When a log reaches a preset size it should be closed and renamed as an archive with logging continuing to an new file.

Administration Support. The framework provides a user interface for the administrator to identify all active configured integrations (e.g., objects for which messages are being published or received) and monitor their health. The administrator can configure new integrations, enable and disable specific integrations; and inspect (debug, event, error) logs from this interface.

System Configurability. Data to be exchanged, data mapping and direction of the exchange are configurable at the time of deployment based on the needs of the customer. Configuration can be limited to certain entries in configuration files and some graphical user interface driven data entry.

A goal of the system 5 is to enable information sharing. Though a database based system makes this easy to achieve, mere are many instances where different pieces of information have to be specifically delivered to a user or an external interface. To achieve this, the system 5 provides a generic mechanism to publish and subscribe information. The mechanism has the ability to register various objects in the application that may be a candidate for publication. The objects may be alerts, score cards, reports, data packages, etc. The rules for publishing are based on the type of object being published. In some embodiments, the system can support at least the following three types of publication:

System Defined—Pre-configured in the system and cannot be removed;

Administrator Defined—managed only by the administrator; and

End User Defined—managed by the end user.

At the time of publication, it should be possible to identify the users, user groups and roles that are authorized to subscribe to the publication. All users in the system can look up the various alerts that have been published to them and decide which ones they want to subscribe to. It may be possible for the user to provide additional information to identify objects of their interest while subscribing to a publication. For example, while subscribing to an alert, the user can provide the condition under which a notification should be generated.

Workflow is an important and critical service provided by system 5. In any business, processes, roles, and functions change constantly. It is possible to associate states and routing information to any object in the system and use the work flow mechanism to ensure that the object gets routed accordingly. System 5 is able to support a default workflow for an object as well as an operating mode specific workflow.

The application programmer can register object types in the application that would go through a workflow. The application can trigger a workflow based on its internal logic. The workflow service determines the current state of the object and propagates it through the workflow based on the state. The state sequence is defined and controlled in the transaction layer of system 5.

Workflow enables routing serially from one user to the next or parallel to multiple users from one user. Furthermore, workflow enables synchronization after parallel routing or routing to a user or user role. Optional recipients of the object whose actions will not alter the state of the object are also routed. Workflow also enables routing to backup approvers if no response is received from the primary approver within a user defined time limit. End users should be able to see the workflow an object goes through and also the current position of the object in the workflow.

Whenever an application submits an object for routing, the workflow manager determines the current state and generates an alert for the next user/users in the chain. The user can get to the actual object directly from a hyperlink on the alert notification, by locating the object from its corresponding 'Locate' page or from the list of pending activities in the user's homepage or workspace.

Once the user gets the object, the user is presented the list of actions that the user can take on the object. These actions are determined by the state transition sequence defined for the object.

Many industries are highly document driven. Quite often certain pieces of information of interest to users are available only in a document. It is also difficult to predict which objects in the system will have attachments. This requires a generic framework through which a user can attach a document to any object in the system that the user has permission to create. Users should be able to identify the file on the local system which is to be uploaded to a controlled shared area on the server. All users with permission to view the primary object would also be allowed to view the, attachment. There should be no limit on the number of attachments that an object may have. The local system can have the viewer capable of displaying the attachment.

In some embodiments, an application programmer is able to register object types for life cycle management. This registration ensures that all objects of that type are committed to an audit trail. In some embodiments, it is possible to reconstruct the object through the user interface. In some embodiments, it is possible to determine at one place in the system all the object types that are being collected in an audit trail.

In some embodiments, each and every object in system 5 has a date and time stamp. In some embodiments, the time stamp is accurate to the nearest second. In some embodiments, irrespective of the physical location of the user, the stamps are in a single time zone for all objects in the system to remove ambiguity about the sequence of events.

The data model layer of core module 1000 provides extreme flexibility to the developers of applications for the system 5 and to end users who need to define key objects in the system. The data model layer provides the framework for building various dimensions of the system that need extensibility even after deployment. System 5 provides the ability to define new object sets and build a classification hierarchy under them. Application programmers may use the generic access functionality to manipulate the objects or define their own specific objects to implement specialized business logic. Reusable user interface components are available to invoke the functionality provided in this layer within applications.

It is possible to add a new object category at any place in the hierarchy. Adding a new category requires the user to identify its location in the hierarchy and give it a unique identification. Preferably, a category's name is unique within its hierarchy.

Once a category has been added to the hierarchy, it is possible to define the properties of the category. The user provides the name for the property, the data type and size, identifies whether the value in the property should be unique, defines default values for the property, and defines valid enumerated values or value ranges. Typically, a category inherits the properties of its ancestors.

Though having information about objects in each dimension in the system is helpful, being able to create relationships between dimensions is a critical requirement. The system 5 is the repository Tor electronic development records and tracking-relationships between the various dimensions is a major focus. Application programmers can register relationships between objects and the properties of the relationship. This concept can be extended to ensure that additional relationships can be created as a part of the deployment task.

The behavior of core module 1000 and the applications built on it is dependent on the operating modes configured on the system. The operating mode is a key factor determining the workflow associated with any object, the states an object passes through, and rules for verification of the data. Gore module 1000 defines any number of operating modes for system 5. Applications use the operating mode to determine their behavior.

Default and valid values for attributes may be defined in the data model layer for the various dimensions. However, these values are subject to change based on operating modes. Additionally, the verification of data pertaining to the transactions themselves should be dependent on the operating mode. This requires the platform to provide a service for defining the verification criteria dependent of the operating mode. If such criteria are not provided at this layer, the system should default to the criteria provided in the data model layer.

For any object that needs to go through a workflow, it is possible to define state transition sequences. State sequences may vary by operating mode and/or location and it is possible to alter the state sequence. When such changes occur, the state sequence should be versioned so that it is possible to determine the exact state sequence an object passed through.

It is hard to predict all the reports required and computations that need to be done on large data sets like electronic development records. The core module 1000 has 'Locate' functions in the system 5 to provide various easy methods of getting to this complex data. Since Excel is the tool of choice for many industries, users have the ability to export the data returned from these searches to Excel.

In some embodiments, each application within system 5 is able to define its reports and associate them with a role. These reports are available to all the users assigned to the role. The reports may typically be defined using an external report writer and may be served by the corresponding report generator. Need for new reports rise regularly at most companies. So, in some embodiments, it is possible to continuously add new reports to the system and associate them with the roles defined in the system. This ensures that the user's choice of reports is automatically updated when the user logs into the system.

In some embodiments, users are able to provide search criteria for the report being requested. This ensures that the user gets a report only for the subset they are interested in. Applications of system 5 can pre-define data packages of interest to the application. These packages may be a collection of predefined reports and can include score cards, checklists and search criteria within the system. Once the package is defined, it is possible to publish it and subscribe to it using the generic publish/subscribe service of the platform.

Gore module 1000 provides a generic framework for defining dashboards. These dashboards provide aggregate visibility based on a type of object in the system. Primary objects in the dashboard are objects such as fixed equipment at a location, currently active tickets at a location, currently active projects at a location, material staging requests at a location, various steps of a particular campaign, etc.

The user should be able to drill down into the details of any of the individual objects from the dashboard. The dashboard displays links to other related objects so that the user can also look up related information. In some embodiments, usability and information aggregation is such that the dashboard is one of the most common points of access for any application.

In some embodiments, applications of system 5 are for use in large corporations that have world wide operations. This automatically translates into requirements to support the variations that one incurs due to local standards. In some embodiments, core module 1000 and applications of system 5 are internationalized and able to support user definable date format (dd/mm/yyyy, mm/dd/yyyy and dd-mon-yyyy), user definable time format and time zone, user definable 1000s separator and radix point, and user definable units of measure. Because the system is highly configurable, all configuration information which will be part of the 'perceived' static part of the user interface should also be localizable.

Figure 4:
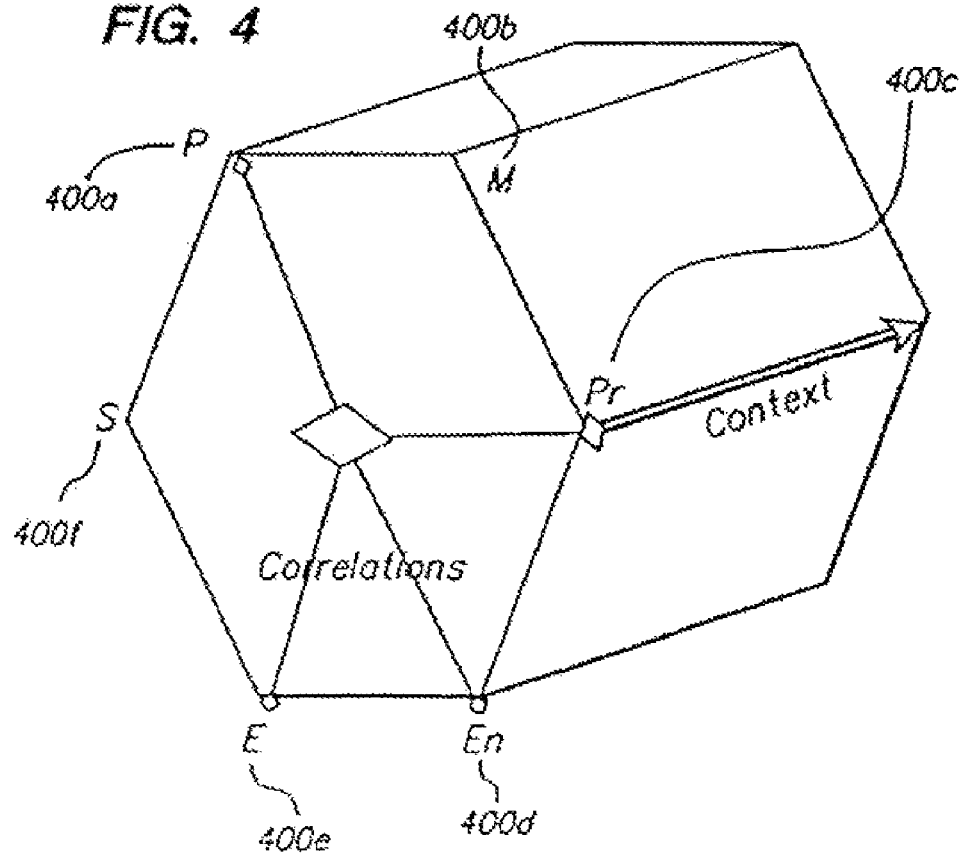
FIG. 4 illustrates the dimensions of data to be collected and analyzed.

The information collected by core module 1000 and related applications and modules is stored and sorted in a data model layer that enables correlations between information to be sorted. Specifically, the data is stored among multiple dimensions that represent all key development activities. Referring to FIG. 4, the dimensions 400 are people 400*a*, materials 400*b*, process 400*c*, environment 400*d*, equipment 400*e* and standards 400*f*. It will be recognized by those of ordinary skill in the art that the dimensions may consist of different labels if desired. Each dimension classifies the type, attribute and status of the information that is recorded with system 5. For example, the equipment dimension 400*e* and material dimension 400*b* classifies the type, as well as defines the attributes and hierarchy of the equipment and material. Furthermore, both equipment dimension 400*e* and material dimension 400*b* set default limits and valid values for the equipment and material. People dimension 400*a* classifies the roles and groups of people as well as defines the roles hierarchy and privilege access. People dimension 400*a* also sets default limits and valid values. Process dimension 400*c* classifies the type of processes, and defines their hierarchy. Furthermore, process dimension 400*c* sets workflow and business rules and creates workflow templates. Environment dimension 400*d* classifies the type of environment, as well as defines the attributes and hierarchy thereof. Default limits and values are set in the environment dimension 400*d*, as well as environmental reference standards. Standards dimension 400*f* can classify the type of standards and create structure data standards. Furthermore, the standards dimension can categorize reference documents and pre-defined processes.

Correlations can be made between the different dimensions in order to sift through the data. For example, uses of correlations include searches for related information, comparisons, verifications, review status, ere. The correlations can be used over time and events in order to determine the "context" of the information. For example, referring to FIG. 4, the people, process, environment and equipment dimensions 400: are in order to give context to the information. The information can be located at any time for a given event (e.g., condition). The context, correlation and dimension data structure allows the electronic development record (eDR) of the material to be easily searched. In this respect, the electronic development record provides alerts and notifications, in-process operational management, knowledge management and development history archival.

Over time, the eDR enables companies to correlate process understanding to particular steps in the process, materials, and composition of the beverage.

Referring to FIG. 5, a platform overview 501 of one embodiment of core module 1000 is shown. The platform overview 501 illustrates four layers of architecture for the core module 1000 in accordance with one embodiment. Specifically, one embodiment of core module 1000 has an analytical layer 500, a transaction layer 502, a data modeling layer 504 and a shared services layer 506. Core module 1000 establishes an enterprise wide platform that provides services, functions, and data models to create a base for product records. In some embodiments, the architecture leverages J2EE technology for open-standard, multi-tiered enterprise architecture. Furthermore, the architecture provides published interfaces for development of applications and ensures interoperability through open interfaces, web services and XML.

Analytical layer 500 includes data package 510, dashboard 512, scorecard 514, and reports 516. Analytical layer 500 provides pre-defined reports and data packages as well as pre-configured scorecards. Furthermore, analytical layer 500 ensures dashboard visibility and role-based reports and indicators.

Transaction layer 502 has context management 518, operating modes management 520 and transaction management 522. Transaction layer 502 provides pre-defined business processes and form templates and implements best practices. Furthermore, transaction layer 502 provides a single user interface, lot traceability throughout production and in-progress visibility.

Data model layer 504 includes correlation modeling 524 and dimension modeling 400. In this embodiment, data model layer 504 only needs to be configured once and includes master libraries. Data model layer 504 is scalable and extendable and provides a central repository of related content. In this regard, data model layer 504 is rapidly deployed and promotes reuse.

Shared services layer 506 provides security, data management, publish and subscribe services, search services and framework integration.

Figure 2:
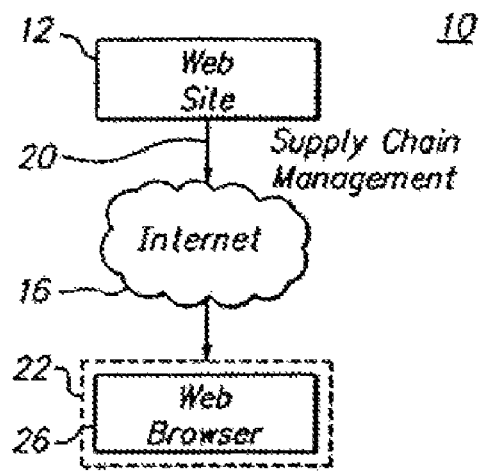
FIG. 2 is a diagram illustrating operation of an embodiment of a supply-side chain management application.

FIG. 2 is a diagram conceptually illustrating operation of an embodiment consistent with the present invention to provide infrastructure that will enable supply chain solutions for regulated industries. Supply chain solution 10 is used with a website 12, which represents one or more applications through which users can engage in worry-free management of their inventory, production, etc. A user with system 22 may interact with website 12 online (or otherwise) using a web-browser 26 communicating through a network connection such as Internet 16 or other type of network in order to obtain information about the status of their production, for example.

FIG. 3 is a block diagram illustrating exemplary hardware components for implementing a system for enabling supply chain solutions for regulated industries. System 30 includes a user system 37 having a user machine 38 connected with a network 60 such as the Internet, providing a network connection for participating in EP ordering. Other user systems, such as user system 56 may also be connected with network 60 for obtaining production status. User system 56, and other user systems, may include the same components as user system 37.

Users at user systems 37 and 56 interact with a server 76 to obtain production status information. Server 76 provides and maintains the web site 12 for providing a network connection to the application(s) through which users can obtain and share information. System 30 may also include the ability to access one or more web site servers 58 in order to obtain content from the Internet, if desired. Only two user systems are shown for illustrative purposes, however, system 30 may include many user machines and may be scalable to add or delete user machines to or from the network.

User machine 38 illustrates typical components of a user machine. User machine 38 typically includes a memory 40, a secondary storage device. 50, a processor 52, an input device 54, a display device 48, and an output device 46. Memory 40 may include random access memory (RAM) or similar types of memory, and may store one or more applications 44, and a web browser 42, for execution by processor 52. Secondary storage device 50 may include a hard disk drive, floppy disk drive, CD-ROM drive, or other types of non-volatile data storage. Processor 52 may execute applications or programs stored in memory 40 or secondary storage 50, or received from the Internet or other network 60.

Input device 54 may include any device for entering information into machine 38, such as a keyboard, mouse, cursor-control device, touch-screen, microphone, digital camera, video recorder or camcorder. Display device 48 may include any type of device for presenting visual information such as, for example, a computer monitor or flat-screen display. Output device 46 may include any type of device for presenting a hard copy of information, such as a printer, and other types of output devices include speakers or any device for providing information in audio form.

Web browser 42 is used to access the application(s) through the web site 12 and display various web pages through which the user can exchange information, and examples of those web pages are described below. Examples of web browsers include the Netscape Navigator program and the Microsoft Internet Explorer program. Any web browser, co-browser, or other application capable of retrieving content from a network and displaying pages or screens may be used.

Examples of user machines for interacting with the web site 42 include personal computers, laptop computers, notebook computers, palm top computers, network computers, or any processor-controlled device capable of executing a web browser or other type of application for interacting with the system.

Server 76 typically includes a memory 62, a secondary storage device 74, a processor 72, an input device 70, a display device 68, and an output device 66. Memory 62 may include RAM or similar types of memory, and it may store one or more applications 64 for execution by processor 72. Secondary storage device 74 may include a hard disk drive, floppy disk drive, CD-ROM drive, or other types of non-volatile data storage. Processor 72 executes the application(s), which is stored in memory 62 or secondary storage 74, or received from the Internet or other network 60. Input device 70 may include any device for entering information into server 76, such as a keyboard, mouse, cursor-control device, touch-screen, microphone, digital camera, video recorder or camcorder. Display device 68 may include any type of device for presenting visual information such as, for example, a computer monitor or flat-screen display. Output device 66 may include any type of device for presenting a hard cop such as a printer, and other types of output devices include speakers or any device for providing information in audio form.

Also, processor 72 may execute one or more software applications 64 in order to provide the functions described in this specification, and the processing may be implemented in software, such as software modules, for execution by computers or other machines. The processing may provide and support web pages described in this specification and otherwise for display on display devices associated with the users' computers. The term "screen" refers to any visual element or combinations of visual elements for displaying information or forms; examples include, but are not limited to, user interfaces on a display device or information displayed in web pages or in windows on a display device. The screens may be formatted, for example, as web pages in Hypertext Markup Language (HTML), Extensible Markup Language (XML) of in any other suitable form for presentation on a display device depending upon applications used by users to interact with the system.

The screens include various sections, as explained below, to provide information or to receive information or commands. The term "section with respect to screens" refers to a particular portion of a screen, possibly including the entire screen: Sections are selected, for example, to enter information or commands or to retrieve information or access other screens. The selection may occur, for example, by using a cursor-control device to "click on" or "double click on" the section. Alternatively, sections may be selected by entering a series of keystrokes or in either ways such as through voice commands or use of a touch screen. In addition, although the screens described below illustrate a particular arrangement and number of sections in each screen, other arrangements are possible and different numbers of sections in the screens may be used to accomplish the same or similar functions of displaying information and receiving information or commands. Also, the same section may be used for performing a number of functions, such as both displaying information and receiving a command.

Although only one server is shown, system 30 may use multiple servers 76 as necessary or desired to support the users and may also use back-up or redundant servers to prevent network downtime in the event of a failure of a particular server. In addition, although machine 37 and server 76 are depicted with various components, one skilled in the art will appreciate that these machines and me server can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system such as machine 37 and server 76, to perform a particular method.

The present invention can be implemented as a computer program product that comprises a computer program mechanism embedded in a computer readable storage medium. Further, any of the methods of the present invention can be implemented in one or more computers or computer systems. Further still, any of the methods of the present invention can be implemented in one or more computer program products.

Some embodiments of the present invention provide a computer system or a computer program product that encodes or has instructions for performing any or all of the methods disclosed herein. Such methods/instructions can be stored on a CD-ROM, DVD, magnetic disk storage product, or any other computer readable data or program storage product. Such methods can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, mobile phone, or other electronic devices. Such methods encoded in the computer program product can also be distributed electronically, via the Internet or otherwise, by transmission of a computer data signal (in which the software modules are embedded) either digitally or on a carrier wave.

The terms and descriptions used herein are set forth by way of illustration only and are not meant as limitations. Those skilled in the art will recognize that many variations are possible within the spirit and scope of the invention as defined in the following claims, and their equivalents, in which, all terms are to be understood in their broadest possible sense unless otherwise indicated.

What is claimed is:

1. A system for managing the development and manufacturing process of a pharmaceutical, the system comprising:
   a processor; and
   a memory coupled with and readable by the processor and having stored therein a sequence of executable instructions, said instructions comprising:
   a plurality of recording modules for recording information about the development and manufacturing process of the pharmaceutical over time; and
   a core module in communication with the recording modules, the core module being configured to receive the information from the plurality of recording modules and provide a platform for the tracking of the information across multiple data dimensions, each of the multiple data dimensions representing a category or activity for the development and manufacturing process, the core module comprising:
   a data modeling layer configured to assign the information to at least one of the multiple data dimensions, perform dimension modeling of the multiple data dimensions, the dimension modeling defining a hierarchy for the categories and activities of the development and manufacturing process and properties for each category or activity and perform correlation modeling of the multiple data dimensions and properties of the relationships, the correlation modeling defining relationships between the multiple data dimensions and properties of the relationship, and
   a transaction layer configured to determine a context of the information based on the dimension modeling and correlation modeling.

2. The system of claim 1 wherein the context defines changes to the information over time and events.

3. The system of claim 1 wherein the correlation relates to common information in different data dimensions of the multiple data dimensions.

4. The system of claim 1 wherein the core module is configured to assign the information to a data dimension of the multiple data dimensions.

5. The system of claim 1 wherein the multiple data dimensions comprise two or more data dimensions selected from the group consisting of material, people, process, equipment, environment and standard.

6. The system of claim 1 wherein the core module further comprises an analytical layer configured to search the dimension modeling and correlation modeling and retrieve information about the development and manufacturing process.

7. The system of claim 6, wherein the analytical layer is further configured to provide reports based on the retrieved information.

8. The system of claim 1 wherein the core module further comprises a shared services layer configured to provide one or more of security services, data management services, publish and subscribe services, and framework integration services.

9. The system of claim 1 wherein the plurality of recording modules includes an inventory management module configured to track and report levels of goods at multiple locations and through the development and manufacturing process.

10. The system of claim 1 wherein the plurality of recording modules includes a regulation module configured to maintain regulatory and tax compliance information and perform compliance reporting.

11. The system of claim 1 wherein the plurality of recording modules includes a content management module configured to maintain and report one or more of industry-specific, company-specific, activity specific, and supplier specific information, methods, and standards.

12. The system of claim 1 wherein the plurality of recording modules includes a catalog management module configured to provide a consolidated view of products across suppliers including a list of ingredients, costs associated with each product, procurement related information for each product and release information.

13. The system of claim 1 wherein the plurality of recording modules includes a process module configured to capture and report activity records or lab analyses records.

14. The system of claim 1 wherein the plurality of recording modules includes a supplier module configured to manage and report information regarding suppliers, products purchased, and costs associated with transactions.

15. A machine-readable memory having stored thereon a sequence of instructions which, when executed by a processor, cause the processor to execute:
   a plurality of recording modules for recording information about the development and manufacturing process of the pharmaceutical over time; and
   a core module in communication with the recording modules, the core module being configured to receive the information from the plurality of recording modules and provide a platform for the tracking of the information across multiple data dimensions, each of the multiple data dimensions representing a category or activity for the development and manufacturing process, the core module comprising:
   a data modeling layer configured to assign the information to at least one of the multiple data dimensions, perform dimension modeling of the multiple data dimensions, the dimension modeling defining a hierarchy for the categories and activities of the development and manufacturing process and properties for each category or activity and perform correlation modeling of the multiple data dimensions and properties of the relationships, the correlation modeling defining relationships between the multiple data dimensions and properties of the relationship, and
   a transaction layer configured to determine a context of the information based on the dimension modeling and correlation modeling.

16. The machine-readable memory of claim 15 wherein the core module further comprises an analytical layer configured to search the dimension modeling and correlation modeling and retrieve information about the development and manufacturing process and wherein the analytical layer is further configured to provide reports based on the retrieved information.

17. The machine-readable memory of claim 15 wherein the core module further comprises a shared services layer configured to provide one or more of security services, data management services, publish and subscribe services, and framework integration services.

18. The machine-readable memory of claim 15 wherein the plurality of recording modules includes an inventory management module configured to track and report levels of goods at multiple locations and through the development and manufacturing process.

19. The machine-readable memory of claim 15 wherein the plurality of recording modules includes a regulation module configured to maintain regulatory and tax compliance information and perform compliance reporting.

20. The machine-readable memory of claim 15 wherein the plurality of recording modules includes one or more of a content management module configured to maintain and report one or more of industry-specific, company-specific, activity specific, and supplier specific information, methods, and standards, a catalog management module configured to provide a consolidated view of products across suppliers including a list of ingredients, costs associated with each product, procurement related information for each product and release information, a process module configured to capture and report activity records or lab analyses records, and a supplier module configured to manage and report information regarding suppliers, products purchased, and costs associated with transactions.

* * * * *

UNITED STATES PATENT AND TRADEMARK OFFICE
CERTIFICATE OF CORRECTION

PATENT NO. : 8,032,431 B2
APPLICATION NO. : 12/857787
DATED : October 4, 2011
INVENTOR(S) : Kataria et al.

It is certified that error appears in the above-identified patent and that said Letters Patent is hereby corrected as shown below:

On Title Page 2, item (56); in column 2, under "Other Publications", line 2, delete "PCT/US07/24020,Aug. 16," and insert -- PCT/US07/24020, Aug. 16, --, therefor.

In column 1, line 27, delete "Heavy" and insert -- Heavily --, therefor.

In column 2, line 20, delete "trail."Typically," and insert -- trail." Typically, --, therefor.

In column 2, line 28, delete "environment," and insert -- environment --, therefor.

In column 5, line 2, delete "resources;" and insert -- resources, --, therefor.

In column 6, line 7, delete "module" and insert -- module, --, therefor.

In column 6, line 26, delete "info" and insert -- into --, therefor.

In column 6, line 30, delete "points," and insert -- points --, therefor.

In column 6, line 31, delete "The." and insert -- The --, therefor.

In column 7, line 4, delete "keeping/through" and insert -- keeping through --, therefor.

In column 7, line 30, delete "tore" and insert -- core --, therefor.

In column 7, line 64, delete "authentication," and insert -- authentication --, therefor.

In column 8, line 18, delete "ED" and insert -- ID --, therefor.

In column 8, line 42, delete "(cheek" and insert -- (check --, therefor.

Signed and Sealed this
Tenth Day of January, 2012

David J. Kappos
*Director of the United States Patent and Trademark Office*

In column 9, line 1, delete "that," and insert -- that --, therefor.

In column 9, line 19, delete "development;" and insert -- development, --, therefor.

In column 9, line 29, delete "Yitria," and insert -- Vitria, --, therefor.

In column 9, line 37, delete "real time" and insert -- real time, --, therefor.

In column 9, line 45, delete "through," and insert -- through --, therefor.

In column 10, line 25, delete "Jogs" and insert -- logs --, therefor.

In column 10, line 35, delete "integrations;" and insert -- integrations, --, therefor.

In column 10, line 44, delete "mere" and insert -- there --, therefor.

In column 11, line 45, delete "the," and insert -- the --, therefor.

In column 12, line 21, delete "Tor" and insert -- for --, therefor.

In column 12, line 21-22, delete "tracking-relationships" and insert -- tracking relationships --, therefor.

In column 12, line 31, delete "Gore" and insert -- Core --, therefor.

In column 13, line 10, delete "Gore" and insert -- Core --, therefor.

In column 13, line 24, delete "world wide" and insert -- worldwide --, therefor.

In column 13, line 55, delete "processes," and insert -- processes --, therefor.

In column 14, line 1, delete "ere." and insert -- etc. --, therefor.

In column 14, line 5, delete "400: are" and insert -- 400 are correlated --, therefor.

In column 14, line 33, delete "data packages" and insert -- data packages, --, therefor.

In column 14, line 61-62, delete "web-browser" and insert -- web browser --, therefor.

In column 15, line 3, delete "EP" and insert -- IP --, therefor.

In column 15, line 20, delete "device." and insert -- device --, therefor.

In column 15, line 23, delete "and may" and insert -- and it may --, therefor.

CERTIFICATE OF CORRECTION (continued)
U.S. Pat. No. 8,032,431 B2

In column 15, line 49, delete "42" and insert -- 12 --, therefor.

In column 16, line 3, delete "cop" and insert -- copy of information, --, therefor.

In column 16, line 19, delete "of" and insert -- or --, therefor.

In column 16, line 27, delete "screen:" and insert -- screen. --, therefor.

In column 16, line 32, delete "either" and insert -- other --, therefor.

In column 16, line 48, delete "me" and insert -- the --, therefor.

In column 16, line 58, delete "system" and insert -- system, --, therefor.

In column 17, line 9-10, delete "Such-permanent" and insert -- Such permanent --, therefor.

In column 17, line 21, delete "which, all" and insert -- which all --, therefor.